United States Patent Office 2,814,172
Patented Nov. 26, 1957

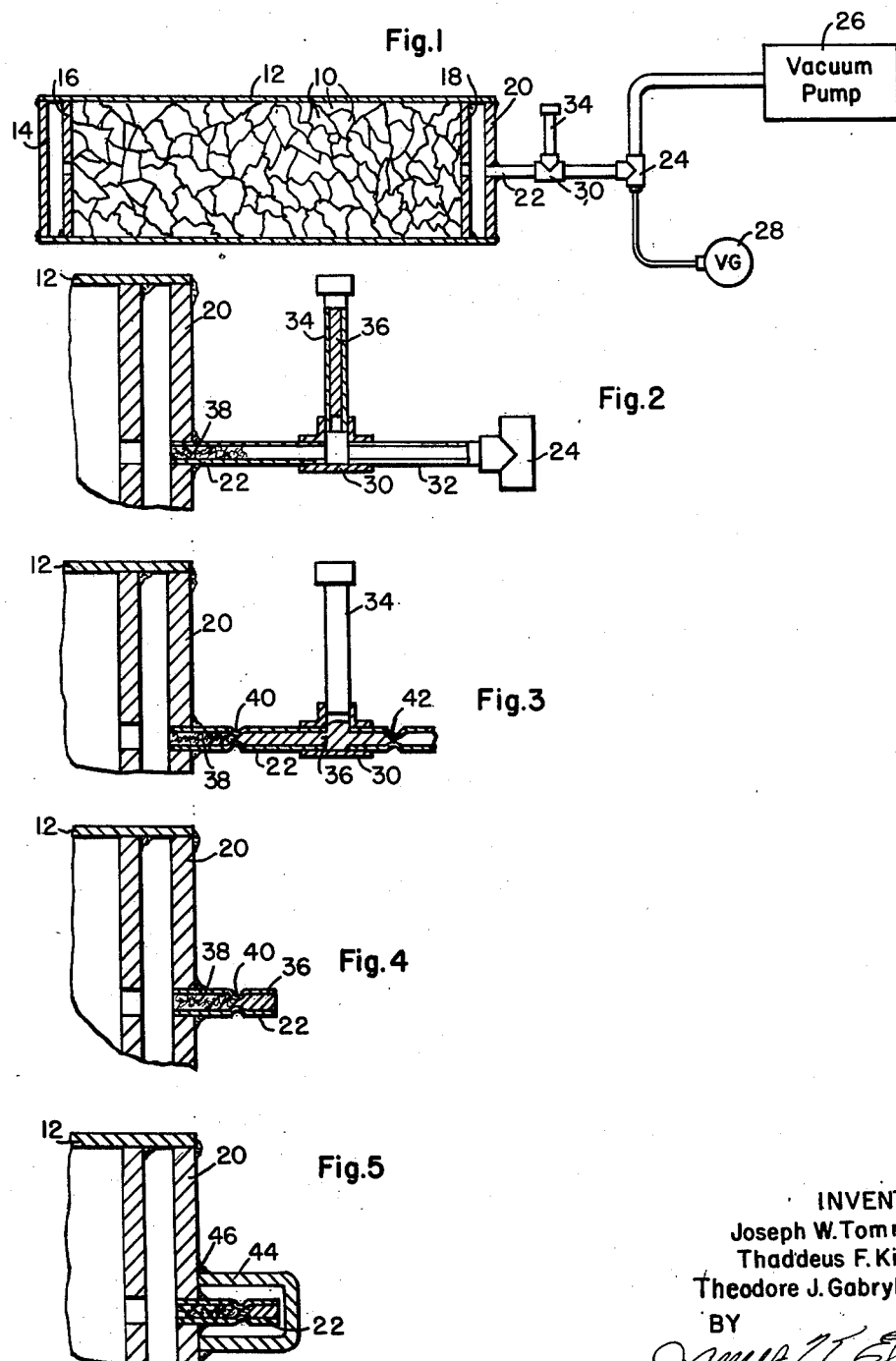

2,814,172
METHOD OF SEALING AN EVACUATED CYLINDER

Joseph W. Tommaney, Thaddeus F. Kilian, and Theodore J. Gabrykewicz, Watervliet, N. Y., assignors to Allegheny Ludlum Steel Corporation, Brackenridge, Pa., a corporation of Pennsylvania Application November 16, 1955, Serial No. 547,162

7 Claims. (Cl. 53—39)

This invention relates to a method of sealing an evacuated cylinder.

In the reclaiming of scrap titanium metal it has been the practice to pack pieces of scrap metal in a cylinder of low carbon steel, for example, Type 1025, and to seal the ends of the cylinder and evacuate the same. Such cylinder is then heated to a temperature of about 1700° F. to 1800° F. and worked at such temperature to compact the scrap pieces and effect a sintering thereof, after which the steel pipe may or may not be removed from such compacted scrap metal, depending upon whether iron is to be present in the electrode resulting from such compacting of the scrap metal. In the past practice it has been quite difficult to effectively seal the evacuated cylinder or maintain such seal with the result that the scrap metal often becomes contaminated during the working of the filled cylinder to form the electrode of scrap metal so that the electrode formed of such compacted scrap metal must in turn be scrapped.

An object of this invention is to provide a method of sealing an evacuated cylinder.

Another object of this invention is to provide, in the method of sealing an evacuated chamber, means for cooperating with solder for effectively sealing the evacuating condition connected to the chamber.

Other objects of this invention will become apparent from the following description when taken in conjunction with the accompanying drawing in which:

Figure 1 is a view in side elevation and partially in section, of an assembly for evacuating a cylinder;

Fig. 2 is a view greatly enlarged and partly in section of a portion of the assembly of Fig. 1 illustrating apparatus utilized in practicing the method of this invention;

Fig. 3 is a view similar to Fig. 2 illustrating a further step of the method of this invention as applied to the assembly of Fig. 2;

Fig. 4 is a view in section similar to Fig. 3 illustrating a seal formed in accordance with this invention, and Fig. 5 is a view in section illustrating the capping of the seal of the assembly of Fig. 4.

In accordance with this invention, pieces 10 of scrap titanium base metal are assembled into a steel cylinder 12, the steel cylinder preferably being of Type 1025 low carbon steel and having any suitable diameter. The steel cylinder 12 may be of any diameter and length depending upon the size of the electrode which it is desired to produce and may range anywhere from two inches in diameter up to as high as twenty inches in diameter. The length is only dependent on the length of the electrode which is to be formed from the pieces 10 of scrap titanium base metal, lengths of twelve feet having been successfully employed. Generally speaking, the cylinder 12 will have a wall thickness of from ⅛ to ½ inch, and preferably in the neighborhood of ¼ inch so that the cylinder will not rupture when worked as described hereinafter to compact the pieces 10 of scrap titanium base metal contained therein. Preferably the cylinder 12, as well as the pieces 10 of scrap metal contained therein, is thoroughly cleaned so as to insure the absence of grease and oil therefrom.

The cylinder 12 illustrated is provided with a bottom end disk 14 and a spaced perforated end disk 16 at one end thereof, such disks being welded into position within the confines of the cylinder 12. After the pieces 10 of scrap metal are positioned in the cylinder 12 to seat against the inner perforated disk 16, a top perforated disk 18 is positioned within the confines of the walls of the cylinder 12 against the scrap metal contained therein, and another end disk 20 is disposed in spaced relation to the perforated end disk 18, both of the disks 18 and 20 being secured as by welding within the confines of the walls of the cylinder 12. Each of the disks 14, 16, 18 and 20 is also preferably formed from a low carbon steel such as Type 1025 and is also of a thickness of from ⅛ to ½ inch, and preferably about ¼ inch. The spaces between the disks 14 and 16, and between the disks 18 and 20, are provided so that in the processing of the evacuated cylinder to be referred to hereinafter, the disks 16 and 18 will be capable of bulging outwardly from the compacted metal contained within the cylinder 12 without rupturing as the filled cylinder 12 is worked. Likewise, the disks 14 and 20 are capable of being bulged outwardly from the filled cylinder to permit the ends of the walls of the cylinder 12 to fold inwardly without rupturing the wall between the end disks 14 and 20.

After the cylinder 12 has been filled and the ends have been sealed as described, the end of the filled cylinder is connected to a suitable exhausting system for effectively evacuating the filled cylinder. Thus the end disk 20 is provided with an exhausting conduit 22 disposed to be connected through a T 24 to a suitable vacuum pump 26 and a pressure gauge 28. As more clearly shown in Fig. 2 of the drawing, the evacuating conduit 22 is connected into a T 30 and by conduit 32 to the T 24, the T 30 also being connected to an upright capped nipple 34 which carries a supply 36 of solder therein. In connecting the filled cylinder 12 to the T 30 to be evacuated, a mass 38 of metallic fibers such as steel wool, for example, is inserted in the evacuating conduit 22 to substantially fill such conduit adjacent the end disk 20, the purpose of which will be explained more fully hereinafter.

With the filled cylinder connected to be exhausted as described, the vacuum pump 26 is operated to evacuate the filled cylinder to a low pressure preferably less than 10,000 microns, and in practice to as low as 500 microns, as indicated by the pressure gauge 28. When the predetermined low pressure or degree of evacuation within the chamber 12 is obtained, the conduit 22 and conduit 32 are crimped as at 40 and 42, respectively, as shown in Fig. 3, to substantially close the conduits. It is to be noted that the crimp 40 in the conduit 22 is applied directly over the zone of the conduit 22 which contains the mass 38 of metallic fibers. In this manner the metallic fibers are compacted so that the reduced cross-sectional area of the conduit 22 is effectively filled with the metallic fibers.

After the conduits 22 and 32 have been crimped as described, the nipple 34 is heated as by means of a blow torch (not shown) or any other suitable heating means, to develop a temperature therein above the melting point of the solder 36 contained within the nipple 34 to cause the solder 36 to flow therefrom into the conduits 22 and 32 and to fill the space between the crimped sections 40 and 42, respectively, thereof. In filling the conduit 22, the solder flows into the mass of compacted metallic fibers contained in the crimped section 40 and efficiently wets such fibers and the inner surface of the crimped section 40 to effect a good solder seal therewith whereby the conduit 22 is effectively sealed. While any suitable solder may be used, excellent results have been obtained with a 50% lead, 50% tin non-flux solder having a melting point of about 421° F. and with a 40% tin, 60% lead acid core solder having a melting point of about 460° F. In thus sealing the conduit 22 it is to be noted that the system is still connected to the vacuum pump to maintain the degree of evacuation within the cylinder 12 throughout the sealing of the conduit 22. It is further to be noted that the crimp 42 in the conduit 32 is effective for preventing flow of the molten solder substantially beyond the crimped section thereof into the evacuating system.

After the solder has solidified in the crimped section 40 for cooperating with the mass of metallic fibers contained therein for sealing the evacuated cylinder 12, the conduit 22 is severed between the crimped section 40 and the T 30 to provide an end of the conduit 22 filled with the solidified solder 36 as illustrated in Fig. 4. The conduit 32 can then be removed from the T 24 so that another conduit connection containing a nipple 34 filled with solder 36 can be assembled with the next cylinder which is to be evacuated.

In order to protect the solder seal in the crimped section of the conduit 22, a metal cap 44 of low carbon steel or the like is disposed over the severed end of the conduit 22 to seat against the face of the end disk 20 as illustrated in Fig. 5, the seating edge of the cap 44 being securely welded to the end disk 20 as at 46. Thus in the further processing of the evacuated cylinder, even though the solder seal in the crimped section 40 of the severed conduit 22 should be heated to a temperature to melt the solder, the evacuated condition of the cylinder 12 is maintained by reason of the cap 44 being welded to the end disk 20, the end cap 44 further preventing mechanical damage to the sealed conduit 22 during the mechanical processing of the filled cylinder.

When the cylinder 12 is filled, evacuated and sealed as described hereinbefore, it is heated to a temperature of 1700° F. to 1800° F. preparatory to compacting the assembly into a predetermined shape and size. In practice it is found that a minimum temperature of 1700° F. is necessary for permitting working of the scrap and effecting sintering of the pieces 10 of scrap metal therein, whereas the maximum temperature of 1800° F. must not be exceeded, as otherwise a eutectic alloy is formed between the scrap metal and the steel sheath which will have a lower melting point than either the cylinder 12 or scrap metal contained therein, with the result that the cylinder is melted with a resulting contamination of the composition of the scrap metal contained therein.

The heated evacuated cylinder is then subjected to a compacting operation obtained by working the heated, filled and evacuated cylinder as by pressure hammering or rolling to effectively compact the pieces 10 within the sealed cylinder 12, the cylinder 12 being correspondingly deformed and functioning as a sheath to maintain the pieces 10 within the sheath or cylinder 12. In working the filled and evacuated cylinder, the assembly may be given any predetermined shape such as a round shape, rectangular shape or polygon shape depending upon the resultant shape desired in the electrode which is being formed from the compacted pieces of scrap metal. When working is applied to the filled and evacuated cylinder to effect the compacting of the miscellaneous sized pieces 10 of titanium base metal, it is found that under such compacting action a sintering of the heated pieces 10 is effected simultaneously with the compacting, the sintering being so thorough that the pieces 10 are sintered into an integral self-sustaining unit. In working the filled and evacuated cylinder, it is found that the cylinder 12 is often elongated to a slight degree and the spaced end disks utilized in the structure permit such elongation without a break or rupture of the welded joints between such disks and the walls of the cylinder 12. Thus, although the end and perforated disks usually deform outwardly from the metal contained within the cylinder 12, the pieces 10 of the titanium base metal contained therein are effectively maintained under evacuated conditions and retained in the cylinder under the compacting action.

As stated hereinbefore, it is preferred that the cylinder 12 be formed of steel having a low carbon content, it being desirable to maintain such carbon content at preferably not over 0.30%. Where it is desired to produce a resultant alloy from the electrode thus formed by the well-known consumable electrode arc melting process, the cylinder may be retained in position over the compacted pieces 10 of scrap metal where it is desired to melt a titanium base alloy containing iron. If, on the other hand, it is desired to melt a titanium base alloy from the compacted pieces of titanium base alloy which is substantially free from iron, then the sheath formed from the cylinder 12 over the compacted pieces of scrap metal can be readily removed from the compacted mass of sintered pieces 10 by cutting through the end disks and cutting the sheath lengthwise of the cylinder 12.

When the evacuated cylinder is sealed as described hereinbefore, it is found that the degree of evacuation is substantially permanent in that cylinders so-sealed, when tested over long periods of time after such seal has been formed, do not show any drop in the degree of evacuation. Thus an efficient seal fully protected under working conditions is effected, thereby making it possible to produce uncontaminated electrodes from pieces of scrap titanium base metal. The method described makes possible the efficient reclaiming of scrap metal and thereby effects economies in the manufacture of titanium base alloys and makes it possible to utilize scrap metal to produce alloys of predetermined compositions and which have a high degree of purity.

We claim:

1. The method of sealing an evacuated cylinder having an evacuating conduit connected thereto, comprising, positioning a mass of metallic fibers in the conduit, crimping the conduit about the mass of metallic fibers to compact them when the cylinder is evacuated, and admitting molten solder to the compacted mass of metallic fibers to cooperate therewith when the solder is solidified to effectively seal the crimped conduit.

2. The method of sealing an evacuated cylinder connected by a conduit to an evacuating system, the conduit having a supply of solder connected thereto, comprising in combination, positioning a mass of metallic fibers in the conduit adjacent the cylinder, crimping a section of the conduit about the mass of metallic fibers to compact the fibers when the cylinder is evacuated, and heating the supply of solder above the melting point thereof to effect a flow thereof into the conduit to wet the metallic fibers and cooperate therewith when solidified to effectively seal the crimped section of the conduit.

3. The method of sealing an evacuated cylinder having an evacuating conduit connected thereto, comprising, positioning a mass of metallic fibers in the conduit adjacent the cylinder, crimping a section of the conduit about the mass of metallic fibers to compact the fibers when the cylinder is evacuated, admitting molten solder to the compacted mass of metallic fibers to cooperate therewith when the solder is solidified to effectively seal the crimped section of the conduit, severing the conduit adjacent the crimped section, and capping the severed conduit to protect the solder seal in the crimped section.

4. The method of sealing an evacuated cylinder having an evacuating conduit connected thereto, comprising, positioning a mass of metallic fibers in the conduit adjacent the cylinder, crimping a section of the conduit about the mass of metallic fibers to compact the fibers when the cylinder is evacuated, admitting molten solder to the compacted mass of metallic fibers to cooperate therewith when the solder is solidified to effectively seal the crimped section of the conduit, severing the conduit adjacent the crimped section, positioning a cap over the severed conduit to engage the cylinder, and welding the cap to the cylinder to form a leak-proof joint therebetween, the cap effectively protecting the solder seal in the conduit to maintain the cylinder in the evacuated condition.

5. The method of sealing an evacuated cylinder connected by a conduit to an evacuating system, the conduit having a supply of solder connected thereto, comprising in combination, positioning a mass of metallic fibers in the conduit adjacent the cylinder, crimping a section of the conduit about the mass of metallic fibers to compact the fibers when the cylinder is evacuated, heating the supply of solder above the melting point thereof to effect a flow thereof into the conduit to wet the metallic fibers and cooperate therewith when solidified to effectively seal the crimped section of the conduit, severing the conduit adjacent the crimped section thereof on the side remote from the cylinder, positioning a cap over the severed conduit to seat in engagement with the cylinder to mechanically protect the solder seal in the crimped section, and welding the cap to the cylinder to form a leak-proof joint therebetween.

6. The method of sealing an evacuated cylinder connected by a conduit to an evacuating system, the conduit having a supply of solder connected thereto, comprising in combination, positioning a mass of metallic fibers in the conduit adjacent the cylinder, crimping the conduit on both sides of the supply of solder to substantially close two sections of the conduit when the cylinder is evacuated, one of the crimped sections of the conduit being about the mass of metallic fibers to compact them, and heating the supply of solder above the melting point of the solder to effect a flow thereof to fill the conduit between the crimped sections whereby the solder cooperates with the compacted mass of metallic fibers when the solder is solidified to effectively seal the conduit.

7. The method of sealing an evacuated cylinder connected by a conduit to an evacuating system, the conduit having a supply of solder connected thereto, comprising in combination, positioning a mass of metallic fibers in the conduit adjacent the cylinder, crimping the conduit on both sides of the supply of solder to substantially close two sections of the conduit when the cylinder is evacuated, one of the crimped sections of the conduit being about the mass of metallic fibers to compact them, heating the supply of solder above the melting point thereof to effect a flow of solder into the conduit between the crimped sections to wet the metallic fibers and cooperate therewith when solidified to seal the conduit, severing the conduit between the crimped sections thereof, positioning a cap over the severed conduit to seat in engagement with the cylinder to mechanically protect the solder seal in the crimped section, and welding the cap to the cylinder to form a leak-proof joint therebetween.

References Cited in the file of this patent
UNITED STATES PATENTS

| 911,387 | Eisenstein | Feb. 2, 1909 |
| 1,914,634 | Eden et al. | June 20, 1933 |